US012024337B2

(12) United States Patent
Hannard et al.

(10) Patent No.: US 12,024,337 B2
(45) Date of Patent: Jul. 2, 2024

(54) CYLINDER-RETAINING APPARATUS FOR A BREATHING APPARATUS

(71) Applicant: DRAEGER SAFETY UK LIMITED, Blyth (GB)

(72) Inventors: Evan Hannard, Tyne & Wear (GB); Darin Ferguson, Northumberland (GB); Gordon Wrigley, Newcastle Upon Tyne (GB)

(73) Assignee: DRAEGER SAFETY UK LIMITED, Northumberland (GB)

(*) Notice: Subject to any disclaimer, the term of this patent is extended or adjusted under 35 U.S.C. 154(b) by 705 days.

(21) Appl. No.: 17/147,890

(22) Filed: Jan. 13, 2021

(65) Prior Publication Data

US 2021/0261299 A1 Aug. 26, 2021

(30) Foreign Application Priority Data

Feb. 26, 2020 (EP) .................................... 20159485

(51) Int. Cl.
*A62B 9/04* (2006.01)
*A44B 11/06* (2006.01)
(Continued)

(52) U.S. Cl.
CPC ............ *B65D 25/22* (2013.01); *A44B 11/065* (2013.01); *A62B 9/04* (2013.01); *A62B 25/00* (2013.01);
(Continued)

(58) Field of Classification Search
CPC ... A62B 9/04; A62B 25/00; B63C 2011/2281; A44B 11/065; A45F 3/14; A45F 2003/166
(Continued)

(56) References Cited

U.S. PATENT DOCUMENTS

| | | | | |
|---|---|---|---|---|
| 3,191,828 A * | 6/1965 | Senne | ..................... | B63C 11/22 224/604 |
| 3,957,183 A * | 5/1976 | Gadberry | ................ | B63C 11/02 224/628 |

(Continued)

FOREIGN PATENT DOCUMENTS

| | | |
|---|---|---|
| CN | 101879357 A | 11/2010 |
| CN | 102207635 A | 10/2011 |

(Continued)

OTHER PUBLICATIONS

Extended European Search Report, dated Aug. 3, 2020, issued in priority European Application No. EP 20159485.0.

(Continued)

*Primary Examiner* — Dean J Kramer
(74) *Attorney, Agent, or Firm* — Saul Ewing LLP

(57) ABSTRACT

Disclosed is a cylinder-retaining apparatus for a breathing apparatus comprising first and second fixing point and a strap apparatus secured to the first fixing point and the second fixing point. The strap apparatus forms a main strap loop for extending around and securing one or more cylinders. The cylinder-retaining apparatus is configurable in: i) an expanded configuration in which the main strap loop provides a first effective length for securing a first number of cylinders; and ii) a contracted configuration in which a portion of a strap of the strap apparatus is folded to form a secondary strap loop and the secondary strap loop is secured to a third fixing point such that the main strap loop forms a second effective length which is shorter than the first effective length and for securing a second number of cylinders less than the first number of cylinders.

15 Claims, 11 Drawing Sheets

(51) Int. Cl.

| | |
|---|---|
| ***A62B 25/00*** | (2006.01) |
| ***B63C 11/22*** | (2006.01) |
| ***B65D 25/22*** | (2006.01) |
| *A45F 3/16* | (2006.01) |

(52) U.S. Cl.
CPC ......... *B63C 11/22* (2013.01); *A45F 2003/166* (2013.01); *B63C 2011/2281* (2013.01)

(58) Field of Classification Search
USPC .......................... 294/150, 151, 163; 224/246
See application file for complete search history.

(56) References Cited

U.S. PATENT DOCUMENTS

| | | | | |
|---|---|---|---|---|
| 5,337,935 | A * | 8/1994 | Chambonnet | B63C 11/02 224/660 |
| 8,517,636 | B2 * | 8/2013 | Wrigley | A62B 9/04 441/116 |
| 8,776,323 | B2 | 7/2014 | McLennan | |
| 9,889,911 | B1 * | 2/2018 | Stella | B63C 11/22 |
| 2010/0282793 | A1 | 11/2010 | Townsend et al. | |
| 2011/0239416 | A1 | 10/2011 | Shinya et al. | |
| 2012/0181316 | A1 | 7/2012 | McLennan | |

FOREIGN PATENT DOCUMENTS

| | | | |
|---|---|---|---|
| DE | 3342202 | A | 7/1984 |
| DE | 240140 | A1 | 10/1986 |
| DE | 3540516 | A1 | 5/1987 |
| DE | 102013016210 | A1 | 4/2015 |
| GB | 2471544 | A | 1/2011 |
| GB | 2520164 | A | 5/2015 |
| WO | 2019211627 | A1 | 11/2019 |

OTHER PUBLICATIONS

Combined Search and Examination Report, dated Jul. 21, 2021, issued in corresponding European Application No. GB2102185.2.

* cited by examiner

CYLINDER-RETAINING APPARATUS FOR A BREATHING APPARATUS

CROSS-REFERENCE TO RELATED APPLICATIONS

This application is based on, and claims priority to European Application No. EP 20159485.0, filed on Feb. 26, 2020, the entire contents of which being fully incorporated herein by reference.

FIELD OF THE INVENTION

The present disclosure relates to a cylinder-retaining apparatus for a breathing apparatus and is particularly, although not exclusively, concerned with an adjustable or cylinder strap apparatus for a breathing apparatus, such as a self-contained breathing apparatus (SCBA).

BACKGROUND OF THE INVENTION

Breathing apparatuses, such as SCBAs, comprise breathing gas cylinders which are replaceable. Such cylinders must be securely retained on the breathing apparatus, so it is known to provide a strap which retains the cylinder against a frame of the breathing apparatus.

However, such prior art straps have a small range of adjustment which only permit them to retain cylinders having a small range of different diameters. However, if an extreme size of cylinder (i.e. very large or small) or more than one cylinder is to be retained, then the adjustment provided by prior art straps may not be sufficient, and an entirely different retaining strap must be swapped in, which can be time consuming and inefficient. Further, even if a prior art strap is sufficiently long to accommodate a wide range of different cylinders, the excess strap material which is present when securing cylinders at the lower end of its range can be difficult to manage, and can cause snagging hazards which are extremely dangerous to emergency services personnel using the breathing apparatus.

Accordingly, it will be appreciated that improvements in cylinder-retaining straps for breathing apparatus are desirable.

STATEMENTS OF INVENTION

According to a first aspect of the present disclosure, there is provided a cylinder-retaining apparatus for a breathing apparatus comprising first and second fixing point and a strap apparatus secured to the first fixing point and the second fixing point, The strap apparatus forms a main strap loop for extending around and securing one or more cylinders. The cylinder-retaining apparatus is configurable in: i) an expanded configuration in which the main strap loop provides a first effective length for securing a first number of cylinders; and ii) a contracted configuration in which a portion of a strap of the strap apparatus is folded to form a secondary strap loop and the secondary strap loop is secured to a third fixing point such that the main strap loop forms a second effective length which is shorter than the first effective length and for securing a second number of cylinders less than the first number of cylinders.

By ‘folded’ it should be understood that the portion of the strap forming the secondary strap loop is doubled back on itself to form a loop of material. It should be understood that by configuring a portion of the main strap in this way, the effective length of the main strap loop is altered. Excess material of the strap which is not in use in the main strap loop may be taken up in the secondary strap loop.

In the expanded configuration, the strap may also be folded to form the secondary strap loop. The secondary strap loop may contain a greater length of the strap in the contracted configuration than in the expanded configuration.

The folded portion of the strap may extend through a first buckle, thereby forming the secondary strap loop. The main strap loop may be formed by the portion of the strap on one side of the first buckle, and the secondary strap loop may be formed by the portion of the strap on the other side of the buckle.

The cylinder-retaining apparatus may further comprise a second buckle through which the secondary strap loop extends and through which the main strap loop extends, such that when the second buckle is moved relative to the main strap loop, the secondary strap loop is moved relative to the main strap loop.

The first and second buckles are configured such that moving the first and second buckles apart along the main strap loop shortens the effective length of the main strap loop, and moving the first and second buckles together along the main strap loop extends the effective length of the main strap loop. Where the first and second buckles are provided, it should be understood that the total length of the strap which is formed into the secondary strap loop is defined by the distance between the first and second buckles.

A pull-down strap may extend between the frame and the second buckle. The pull-down strap may be secured to a further fixing point between the first and second fixing points. It should be understood that the pull-down strap is for the purpose of pulling a portion of the main strap loop closer to a frame of the breathing apparatus between two cylinders so as to secure multiple cylinders more securely. More than one pull-down strap may be provided if the breathing apparatus is configured to use more than two cylinders. It should be understood that the present disclosure could be applied to provide breathing apparatuses which are adjustable between single- and double-cylinder configurations, or between configurations having other numbers of cylinders in their expanded and contracted configurations.

The second buckle may define a first portion of the main strap loop between the first fixing points and the second buckle, and a second portion of the main strap loop between the second fixing point and the second buckle. In other words, first and second portions of the main strap loop may be formed either side of the second buckle. Where a pull-down strap is provided, the first and second portions of the main strap loop may be formed on opposing sides of the pull-down strap. The first and second portions of the main strap loop may be configured to contact and secure a respective cylinder in the extended configuration.

In the expanded configuration, the second buckle may be arranged relative to the main strap loop such that the first and second portions of the main strap loop are substantially equal in length. Accordingly, two cylinders of the same size may be secured conveniently.

In the contracted configuration, the second buckle may arranged relative to the main strap loop proximate the second fixing point, such that the second portion of the main strap loop is substantially shorter in length than the first portion of the main strap loop. In other words, the second portion of the main strap loop may be negligible in length. In the contracted position, the secondary strap loop may overlay the main strap loop between the first buckle and the third fixing point.

In the expanded configuration, the second portion of the main strap loop may be at least partially overlaid by the secondary strap loop.

The second portion of the main strap loop may be overlaid by the secondary strap loop between the first and second buckles.

The cylinder-retaining apparatus may further comprise a securing buckle for applying tension to the main strap loop.

The third fixing point may be one or more of: i) proximate the second fixing point; ii) outside of the first and second fixing points; or iii) releasable to secure or release the secondary strap loop by hand.

The cylinder retaining apparatus may further comprise a frame for supporting one or more breathing gas cylinders. The frame may comprise the first, second, and third fixing points.

According to a second aspect of the present disclosure there is provided a breathing apparatus comprising a cylinder-retaining apparatus according to the first aspect described above.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

In order to place the invention in context, a prior art system will be described first.

Figure 1A:
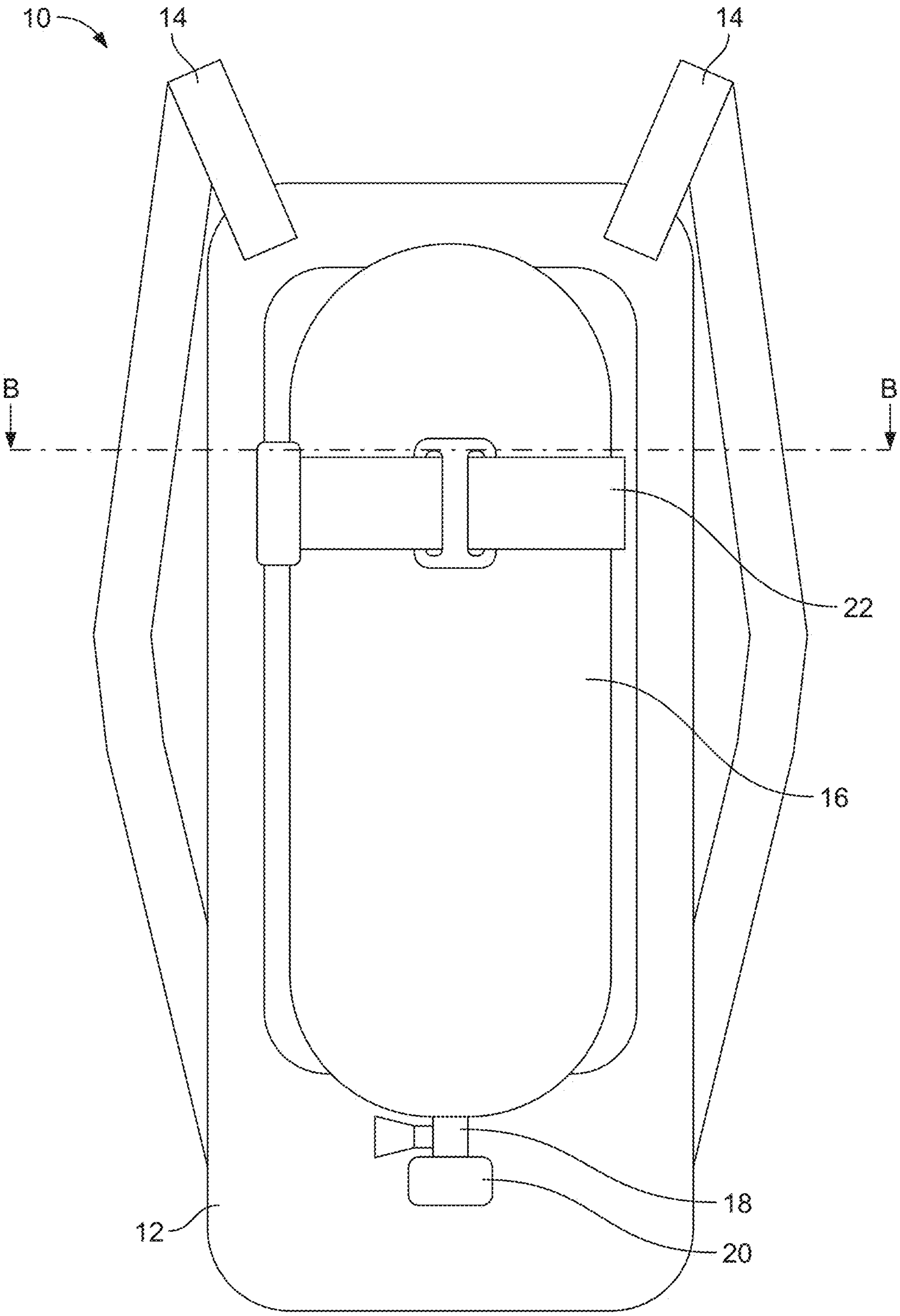
(PRIOR ART) FIG. 1A
FIG. 1A is a rear view of a prior art breathing apparatus.
Figure 1B:
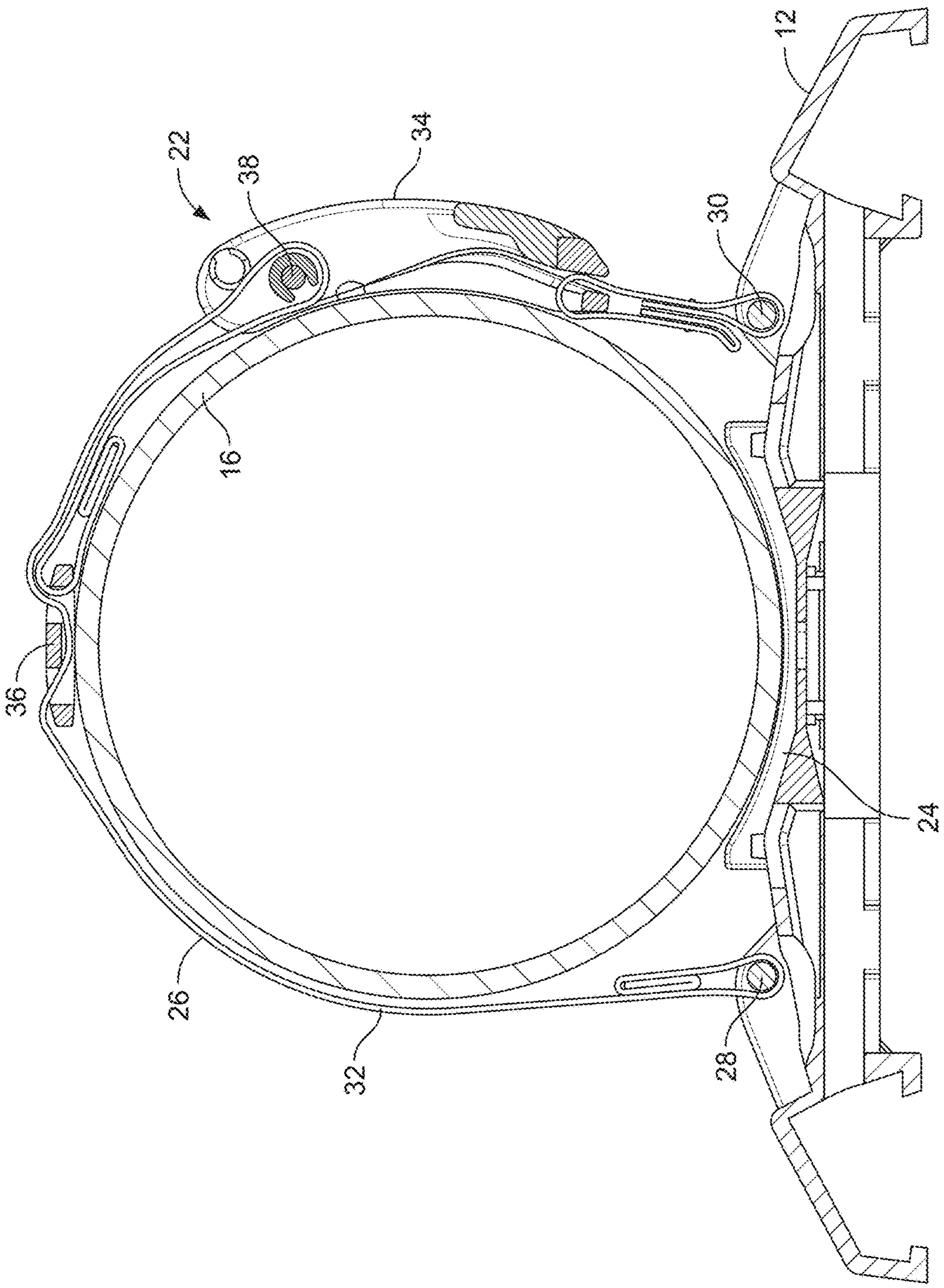
(PRIOR ART) FIG. 1B
FIG. 1B is a sectional view of the prior art breathing apparatus of FIG. 1A.

FIGS. 1A and 1B illustrate a prior art breathing apparatus 10. The breathing apparatus in this case is a self-contained breathing apparatus or "SCBA". The SCBA 10 comprises a frame 12, which is wearable on a user's back using shoulder straps 14.

FIG. 1A shows a rear view of the breathing apparatus 10. The frame 12 supports a breathing gas cylinder 16 (which will be referred to simply as a "cylinder" for brevity in this description). The cylinder 16 comprises a valve apparatus 18 at an end thereof which is attached to a cylinder attachment 20 provided on the lower end of the frame 12. This attachment 20 secures the lower end of the cylinder to the frame 12. In some examples, the attachment 20 is a pressure reduction valve provided on the frame 12 to which the cylinder valve apparatus 18 is attached. The cylinder 16 extends generally longitudinally along the frame 12, so the upper end of the cylinder also requires retaining in order to avoid putting undue stress on the attachment 20 and valve 18. Therefore, a cylinder-retaining apparatus 22 is provided proximate an upper end of the frame 12. In this example, the cylinder retaining apparatus 22 retains the cylinder 16 proximate an upper end of the cylinder 16, but in other examples, it may be arranged to retain the cylinder 16 at another location.

In FIG. 1B, the breathing apparatus 10 can be observed in more detail. FIG. 1B shows a sectional view of the frame 12, cylinder 16, and cylinder retaining apparatus 22 along the line BB in FIG. 1A, viewed longitudinally down the apparatus 10. The frame 12 comprises a cylinder cradle 24 which has a concave profile to receive the convex shell of the cylinder 16, and locate it in the correct position on the frame 12.

The cylinder-retaining apparatus 22 comprises a strap apparatus 26 which forms a strap loop which extends around the cylinder 16. A first end of the strap apparatus 26 is secured to the frame 12 at a first fixing point 28 and a second end of the strap apparatus is secured to a second fixing point 30. The first and second fixing points 28 and 30 are arranged on opposing lateral sides of the cylinder cradle 24 such that the strap apparatus 26, when tightened, urges the cylinder 16 against the cradle 24.

The strap apparatus 26 comprises main strap 32, formed in this example from a flexible webbing material, a tensioning mechanism 34, and an adjustment buckle 36. The main strap is looped through the adjustment buckle 36, and around an axle 38 of the tensioning mechanism 34. Accordingly, the total length of the strap apparatus 26 can be adjusted by moving the adjustment buckle 36 relative to the main strap 32.

To attach and secure the cylinder 16 to the frame 12, the tensioning mechanism 34 is released, the adjustment buckle 36 is moved towards the tensioning mechanism 34 so as to maximise the length of the strap apparatus 26. Next, the cylinder 16 is placed on the frame 12 in the cylinder cradle 24. The adjustment buckle 36 is them moved relative to the main strap 32 towards the first fixing point 28 (i.e. away from the tensioning mechanism 34) to reduce the total length of the strap apparatus 26 such that closely fits the cylinder 16. The tensioning mechanism 34 is then engaged to apply tension to the strap apparatus 26, so as to retain the cylinder 24 against the cradle 24.

Therefore, it will be understood that this prior art cylinder retaining apparatus 22 has a small range of adjustment which permits it to retain cylinders having a range of different diameters. However, if an extreme size of cylinder (i.e. very large or small) or more than one cylinder is to be retained, then the adjustment provided by this apparatus will not be sufficient, and an entirely different retaining apparatus must be swapped in, which can be time consuming and inefficient.

Figure 2A:
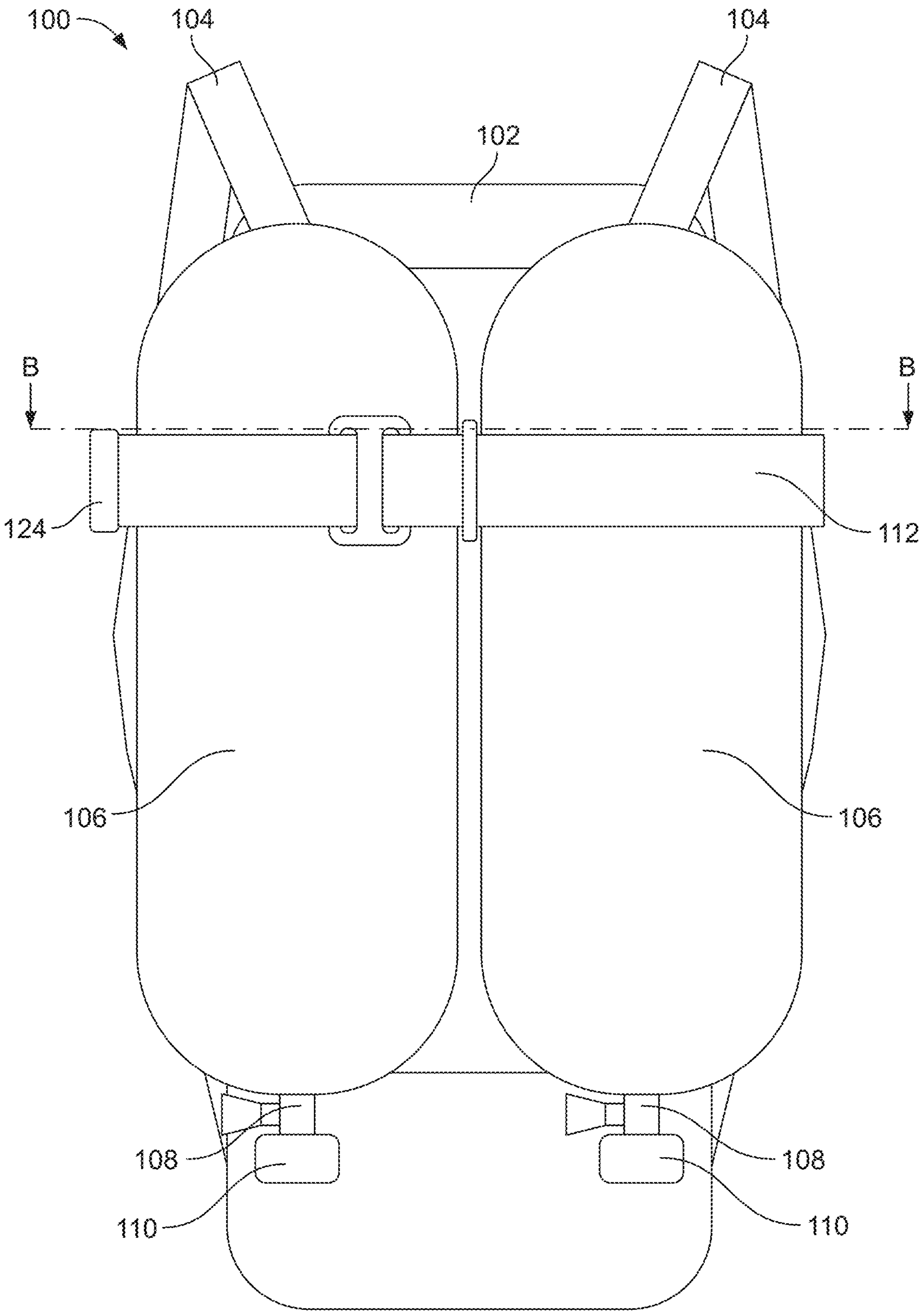
FIG. 2A is a rear view of an exemplary breathing apparatus comprising a cylinder retaining apparatus according to the present disclosure in an expanded configuration.
Figure 2B:
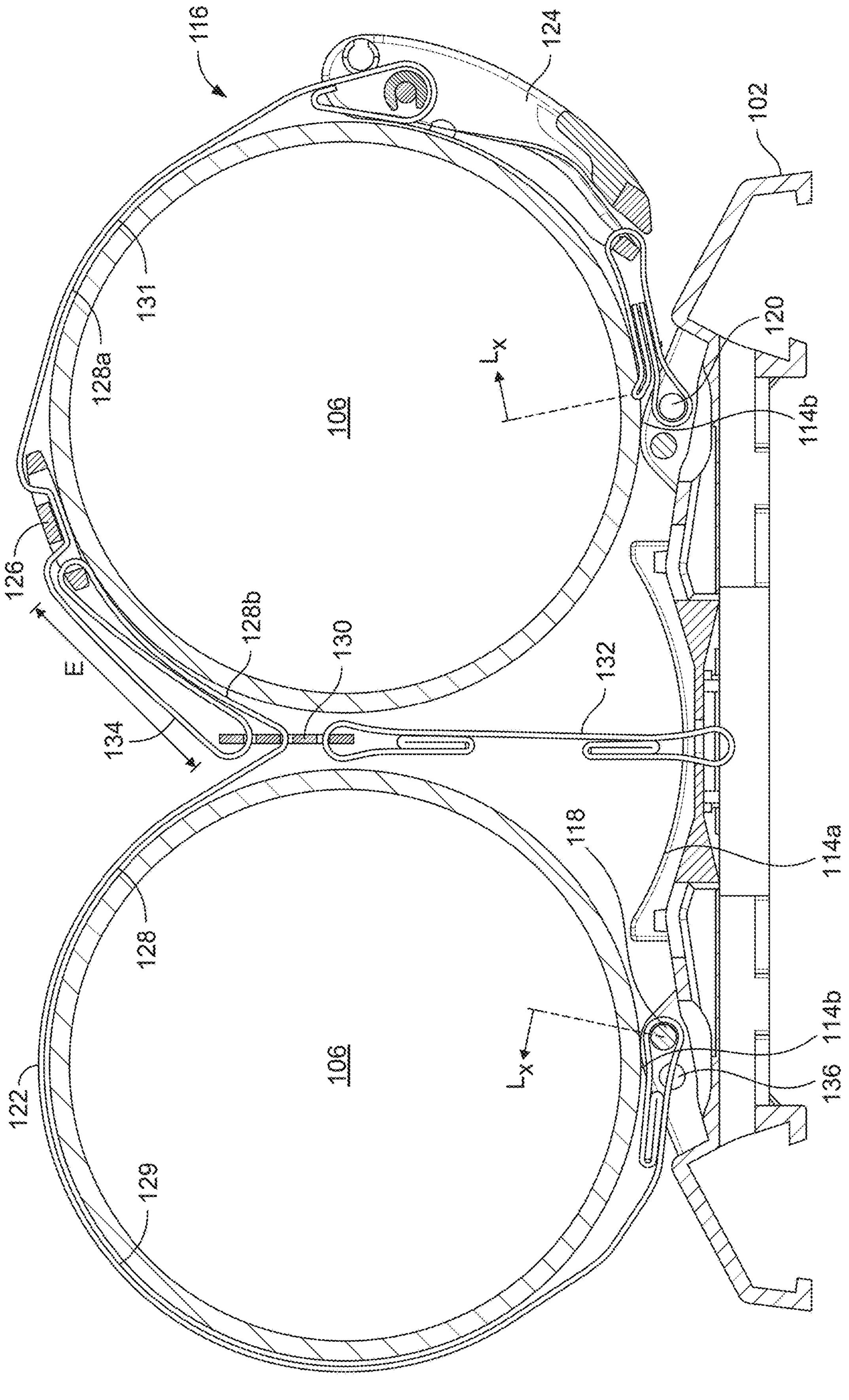
FIG. 2B is a sectional view of the breathing apparatus of FIG. 2A.
Figure 3:
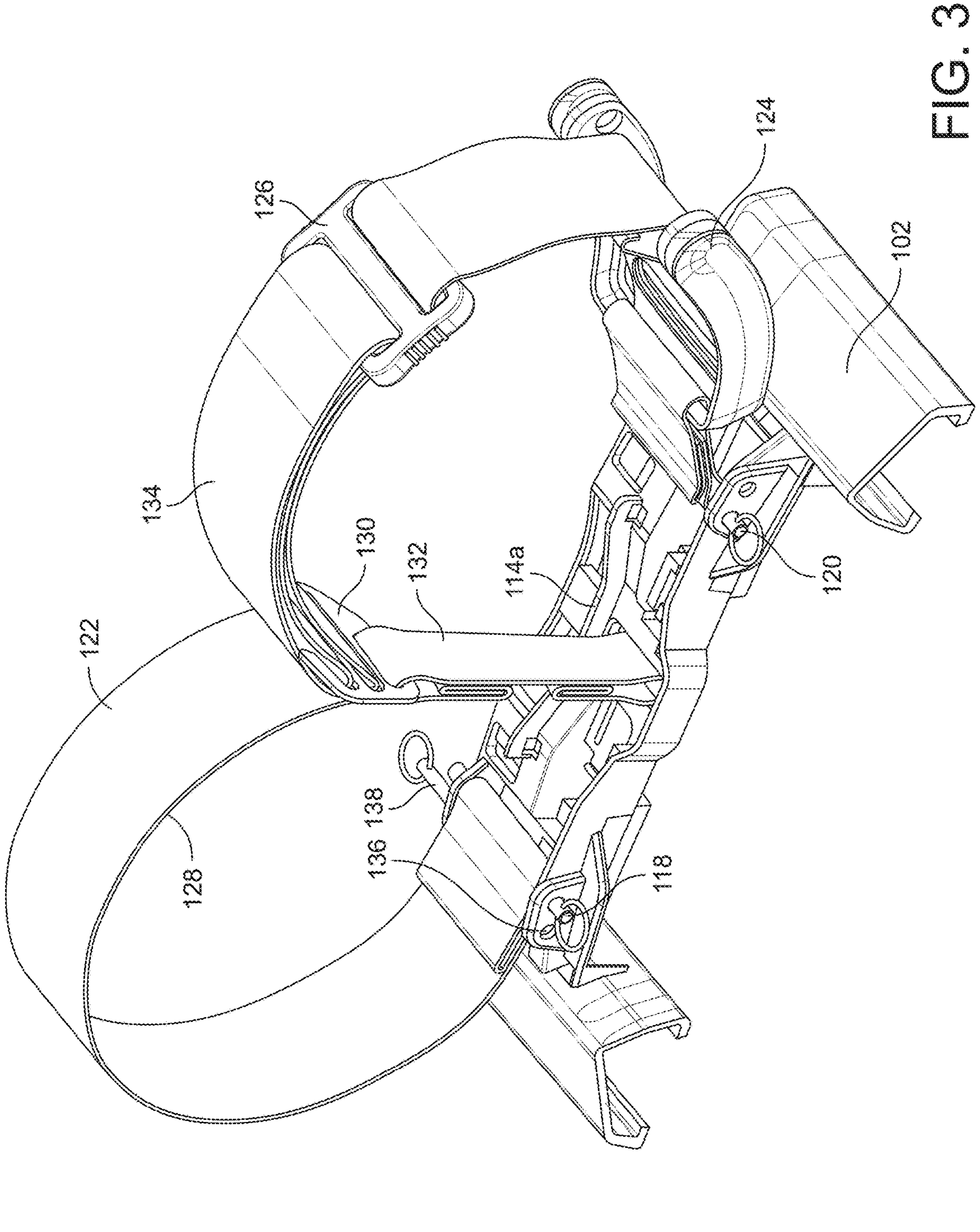
FIG. 3 is a perspective view of the cylinder retaining apparatus of FIGS. 2A and 2B.

FIGS. 2A, 2B, and 3 illustrate an exemplary embodiment in accordance with this disclosure. In FIGS. 2A and 2B, a breathing apparatus 100 is shown. The breathing apparatus 100 comprises a frame 102, which is wearable on a user's back using shoulder straps 104. The breathing apparatus 100 in this case is a self-contained breathing apparatus or "SCBA", but it should be understood that other breathing apparatus types, such as closed circuit breathing apparatus (CCBA), could apply the principles of this disclosure.

FIG. 2A shows a rear view of the breathing apparatus 100. The frame 102 supports two breathing gas cylinders 106 (each of which will be referred to simply as a "cylinder" for brevity in this description). Each cylinder 106 comprises a valve apparatus 108 at an end thereof which is attached to a respective cylinder attachment 110 provided on the lower end of the frame 102. The attachment 110 secures the lower end of the cylinder 106 to the frame 102. In other examples, a manifold may be provided to join the cylinder valves 108 to a single attachment 110 provided on the frame 102.

The cylinders 106 extends generally longitudinally along the frame 102 and side-by side. A cylinder-retaining apparatus 112 is provided proximate an upper end of the frame 102 to secure an upper end of each of the cylinders 106. In this example, the cylinder retaining apparatus 112 retains the cylinder 106 proximate an upper end of the cylinder 16, but in other examples, it may be arranged to retain the cylinders 16 at another location.

It is important to appreciate that, in FIGS. 2A, 2B, and 3, the cylinder-retaining apparatus 112 is configured in an expanded configuration for retaining two cylinders. As will be evident from this description as a whole, the cylinder-retaining apparatus 112 can also be configured in at least one other configuration, a contracted configuration, to hold one cylinder. It should be understood that the principles of the present disclosure could be applied to construct a cylinder retaining apparatus which could retain different numbers of cylinders in its respective expanded and contracted configurations than the exemplary embodiments described here.

In FIG. 2B, the breathing apparatus 100 can be observed in more detail. FIG. 2B shows a sectional view of the frame 102, cylinders 106, and cylinder retaining apparatus 112 along the line BB in FIG. 2A, viewed longitudinally down the apparatus 100. The frame 102 comprises a cylinder cradle 114 which has a single central concave profile 114*a* to receive the convex shell of a single cylinder in the contracted configuration, and dual concave profiles 114*b* laterally spaced apart for receiving respective cylinders 106 in this expanded configuration. The profiles 114*b* serve to locate the cylinders 106 in the correct position on the frame 102.

The cylinder-retaining apparatus 112 comprises a strap apparatus 116 which is secured at first and second ends respectively to a first fixing point 118 and a second fixing point 120 so as to form a main strap loop 128 for extending around and securing one or more cylinders. The strap apparatus 116 comprises a strap 122 (having length S and formed from a flexible webbing material), a tensioning mechanism 124, and an adjustment buckle 126. The tensioning mechanism 124 in this example is an over-centre mechanism for applying tension to the strap 122, but other tensioning mechanisms are possible.

Figure 6:
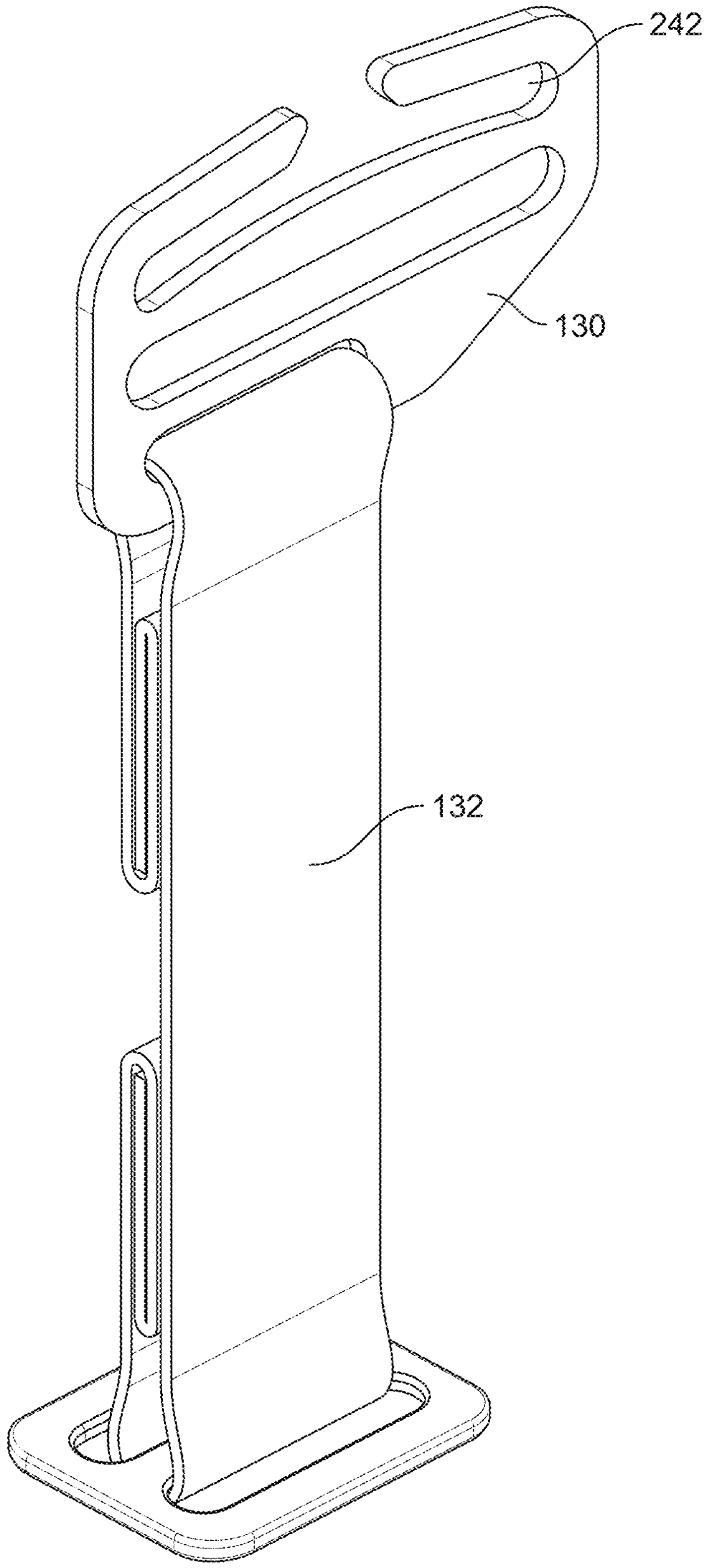
FIG. 6 is a perspective view of a pull-down strap of a cylinder retaining apparatus.

Additionally, the strap apparatus comprises a pull-down buckle 130 which is secured to a distal end of a pull-down strap 132, as shown in detail in FIG. 6. The other end of the pull-down strap 132 is secured to the frame 102 at a point equidistant between the first and second fixing points 118, 120. The pull-down strap 132 is shorter in length than the diameter of the cylinders 106 and the strap 122 extends through the pull-down buckle 130, such that the strap 122 is pulled-down between the cylinders 106 to provide additional contact of the strap 122 between the cylinders 106. The pull-down buckle 130 separates the main strap loop 128 into a first cylinder retaining portion 129 for securing one of the cylinders 106, and a second cylinder retaining portion 131 for securing the other of the cylinders 106.

The portion of the strap 122 which extends around both cylinders 106 is the main strap loop 128. As can be observed in FIG. 2B, a portion of the strap 122 extends through the adjustment buckle 126 to form a secondary strap loop 134. The secondary strap loop 134 is essentially a folded portion of the strap 122 which is fed through the adjustment buckle 126. This folded portion of the strap 122, or secondary strap loop 134, extends around a portion of the pull-down buckle 130, which therefore maintains the secondary strap loop 134 in its folded position. The main strap loop may be formed by the portion of the strap 122 on one side of the adjustment buckle 126, and the secondary strap loop 128 may be formed by the portion of the strap 122 on the other side of the adjustment buckle 126.

By 'folded', it should be understood that the portion of the strap 122 forming the secondary strap loop is doubled back on itself to form a loop of strap material. It should be understood that by configuring a portion of the strap 122 in this way, and by adjusting the relative proportion of the strap 122 which is utilised in the secondary strap loop 134, the effective length of the main strap loop 128 can be altered.

It should be understood that, although the strap 122 is continuous, the strap is notionally divided into the main and secondary strap loops. The main strap loop may be the portion of the strap 122 which contacts the cylinders 106, and the secondary strap loop may be the portion of the strap which is folded to take up excess length of the strap 122 to ensure an appropriate strap length for the cylinder(s) in use. As can be seen in FIG. 2B, the main strap loop 128 is essentially divided into two parts 128*a* and 128*b*, which are formed on opposing sides of the adjustment buckle 126 and secondary strap loop 134. In this exemplary embodiment, the secondary strap loop 134 is present in the expanded configuration, but it should be understood that in other examples, such as that shown in FIGS. 7A and 7B below, the secondary strap loop 134 may not be present in the expanded configuration.

In this expanded configuration shown in FIGS. 2A, 2B, and 3, the main strap loop 128 provides a first effective length, Lx, between the first and second fixing points for securing the two cylinders 106. The approximate length of the strap 122 which is utilised in the secondary strap loop 134 is twice the distance E, which is the distance between the adjustment buckle 126 and the distal end of the secondary strap loop 134 (which is defined in this example by the pull-down buckle 130). Accordingly, the effective length of the main strap loop 128 in this expanded configuration is S−(2×E). It will be appreciated that cylinders 106 of different diameters can be accommodated in the expanded configuration by finely adjusting the distance E i.e. by moving the adjustment buckle 126 relative to the pull-down buckle 130 to adjust the amount of the strap 122 which is utilised in the secondary strap loop 134.

However, when changing from a dual-cylinder configuration to a single-cylinder configuration is required, a more substantial adjustment of the cylinder-retaining apparatus 112 is required.

Figure 4A:
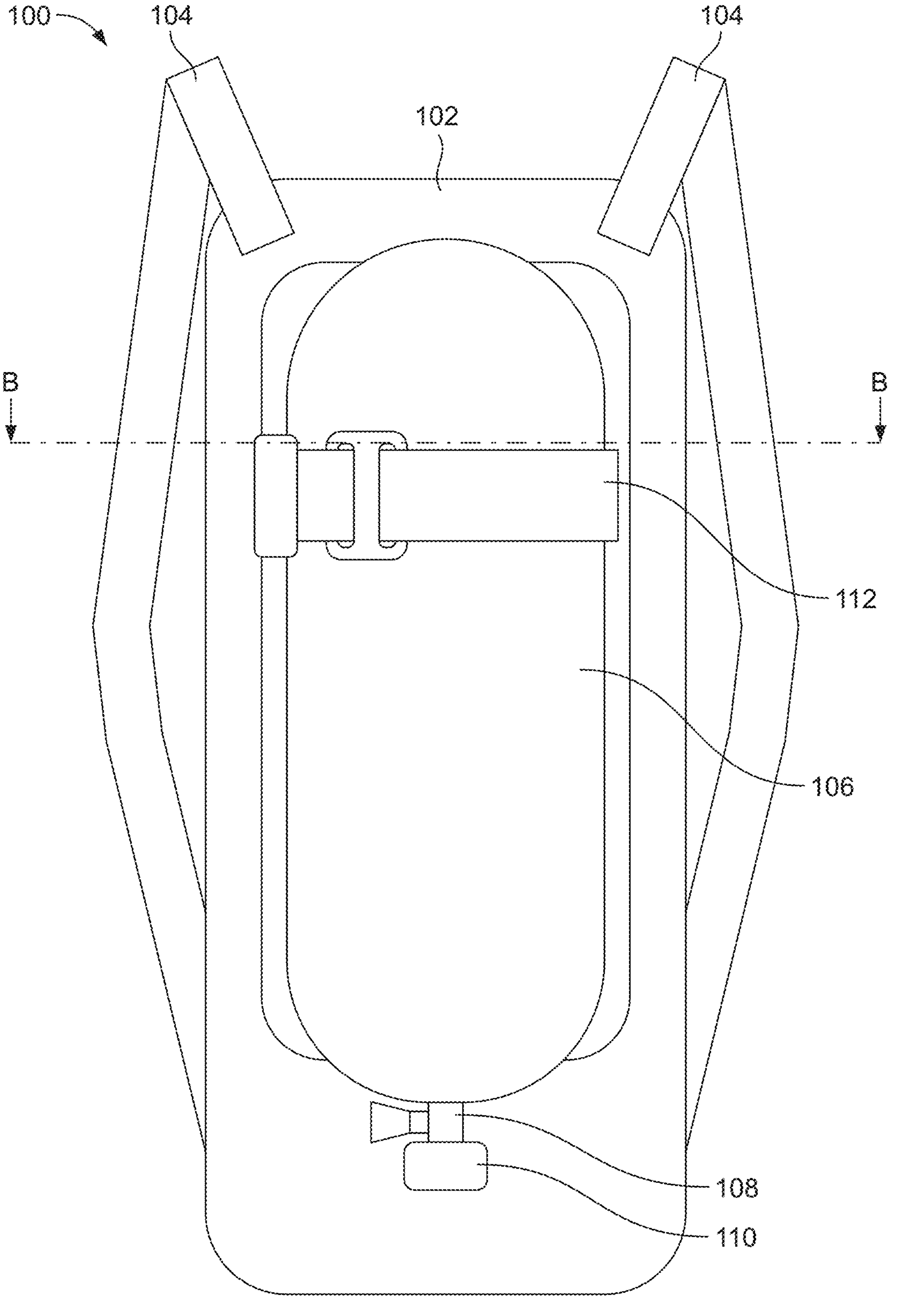
FIG. 4A is a rear view of an exemplary breathing apparatus comprising a cylinder retaining apparatus according to the present disclosure in a contracted configuration.
Figure 4B:
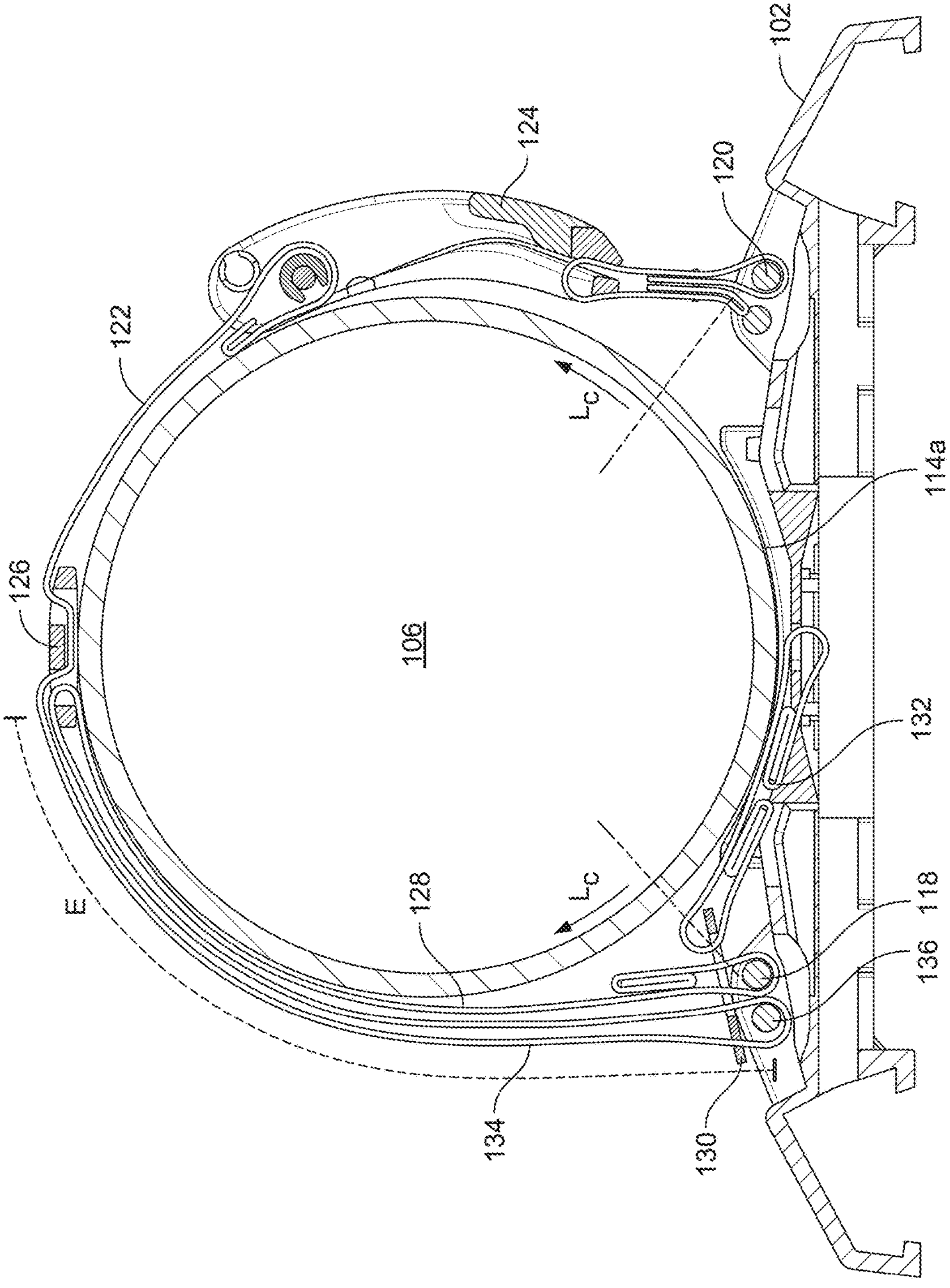
FIG. 4B is a sectional view of the breathing apparatus of FIG. 4A.
Figure 5:
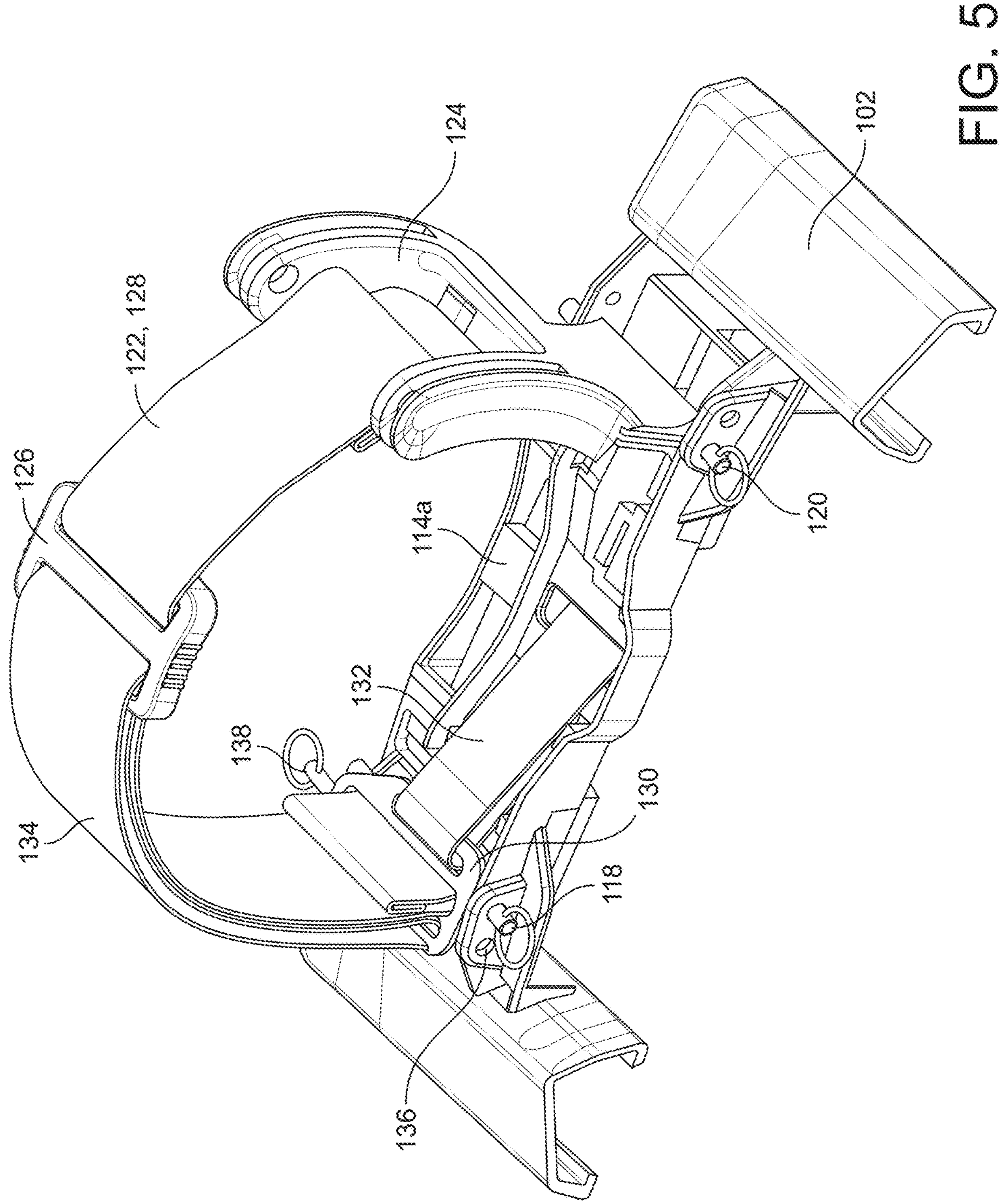
FIG. 5 is a perspective view of the cylinder retaining apparatus of FIGS. 4A and 4B in the contracted configuration.

Turning now to FIGS. 4A, 4B, and 5, the breathing apparatus 100 and, in particular, the cylinder-retaining apparatus 112 is shown in a contracted configuration for securing fewer cylinders than the expanded configuration.

As can be observed in FIG. 4B, the excess portion of the strap 122 which is folded to form the secondary strap loop 128 is far longer in this contracted configuration.

In the contracted configuration of FIG. 4B, the secondary strap loop 134 has been extended by feeding additional length of the strap 122 through the adjustment buckle 126, and the distal end of the secondary strap loop 134 has been secured to a third fixing point 136 on the frame 102. Therefore, as a far greater proportion of the strap 122 is utilised in the secondary strap loop 134, the main strap loop 128 forms an effective length, Lc, between the first and second fixing points, which is shorter than the effective length, Lx, of the expanded configuration.

In the contracted configuration shown, the distance E (which is half the total length of the strap 122 which is utilised in the secondary strap loop 134) is defined by the distance between the third fixing point 136 and the adjustment buckle 126. Accordingly, fine adjustment of the main strap loop's 128 effective length can still be achieved by moving the adjustment buckle 126 along the strap 122 to adjust the distance E.

As can be observed in FIG. 5, the third fixing point 136 is formed by an axle pin 138. The axle pin 138 is retractable such that it can be retracted to attach and detach the secondary strap loop 134 when adjusting between the expanded and contracted configurations. In other examples, the third fixing point could be any releasable fixing for securing the secondary strap loop. For example, the third fixing point could alternatively be provided by an open or cut-away slot, of similar form to slot 242 described below.

In this example, the third fixing point 136 is provided proximate the first fixing point 118. The third fixing point 136 could also or alternatively be provided in other locations, such as laterally outside of the first and second fixing points. More than one additional fixing point could be provided to enable a number of contracted/expanded configurations for securing different numbers of cylinders.

In the contracted configuration of this example, where only one cylinder 106 is retained, the pull-down strap 132 is not required, so it can be stowed flat against the frame 102 by moving the pull-down buckle 130 to a position adjacent the first and third fixing points 118,136. As the secondary strap loop 134 is still looped around the pull-down buckle 130, a convenient way to of increase the secondary strap loop's length in the contracted configuration is to move the pull-down buckle 130 towards the third fixing point 136 relative to the main strap loop 128, as the distal end of secondary strap loop 134 will likewise be moved.

Overall, it should be understood that the portion of the strap 122 which, in the expanded configuration, would have accommodated the additional second cylinder, is accommodated in the contracted configuration by the greatly expanded secondary strap loop 134. As the secondary strap loop 134 is much larger in the contracted configuration, and loose strapping can cause a safety hazard, the securing of the secondary strap loop to the third fixing point 136 conveniently stows the excess strap material safely flat against the breathing apparatus 100.

The invention provides a far greater range of adjustment than prior art systems by allowing a significant proportion of a long multiple-cylinder strap to be taken up in a secondary strap loop. Accordingly, a strap which can accommodate multiple cylinders can be adjusted using the principles of the present disclosure to retain fewer cylinders by taking up the excess in a secondary strap loop, which can be conveniently secured to an additional fixing point.

Owing to the folded design of the secondary strap loop it can be configured to overlay the main strap loop, so as to minimize the profile of the breathing apparatus and avoid loose strapping which would present a snagging hazard.

Figure 7A:
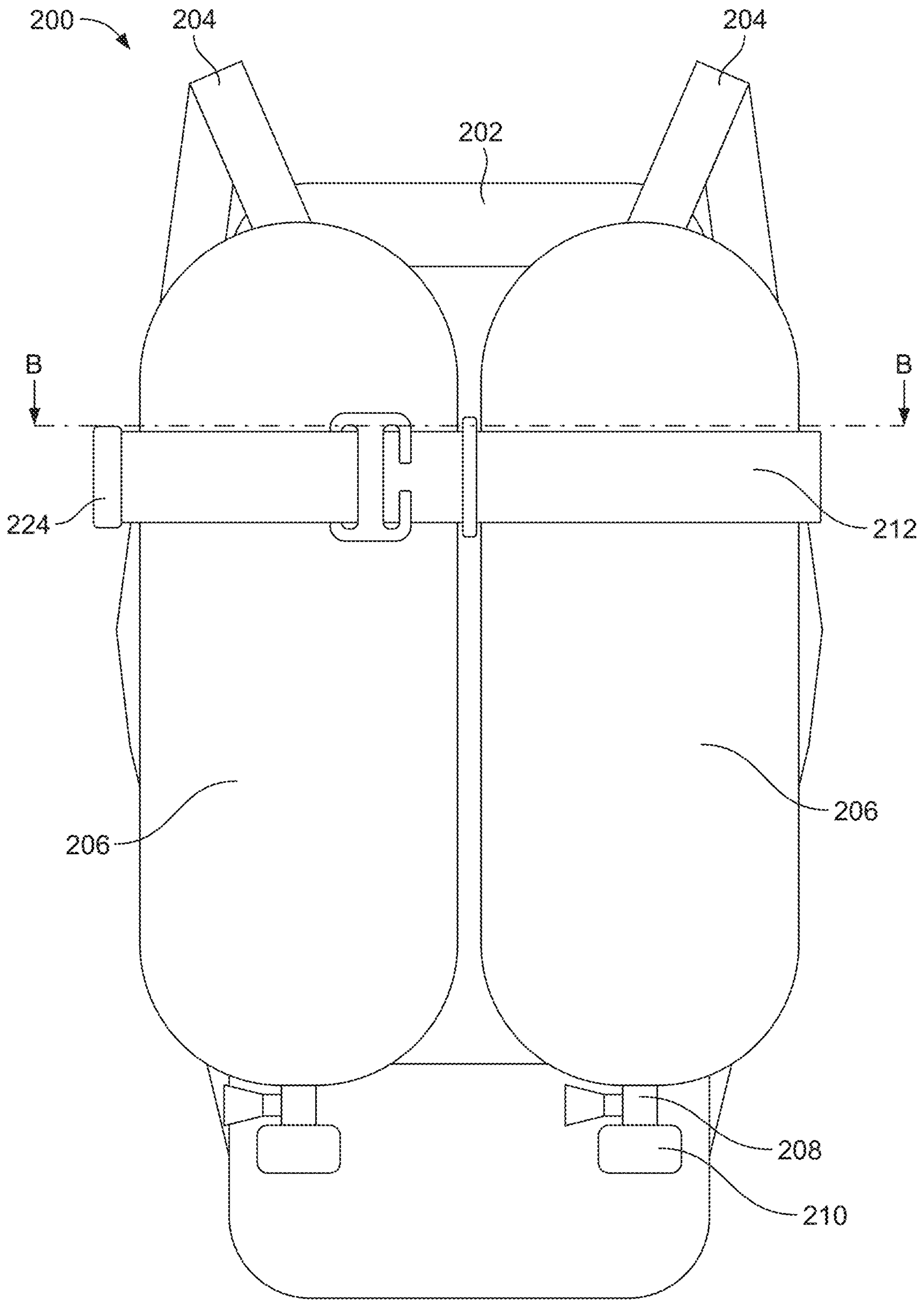
FIG. 7A is a rear view of a further exemplary breathing apparatus comprising a cylinder retaining apparatus according to the present disclosure in an expanded configuration.
Figure 7B:
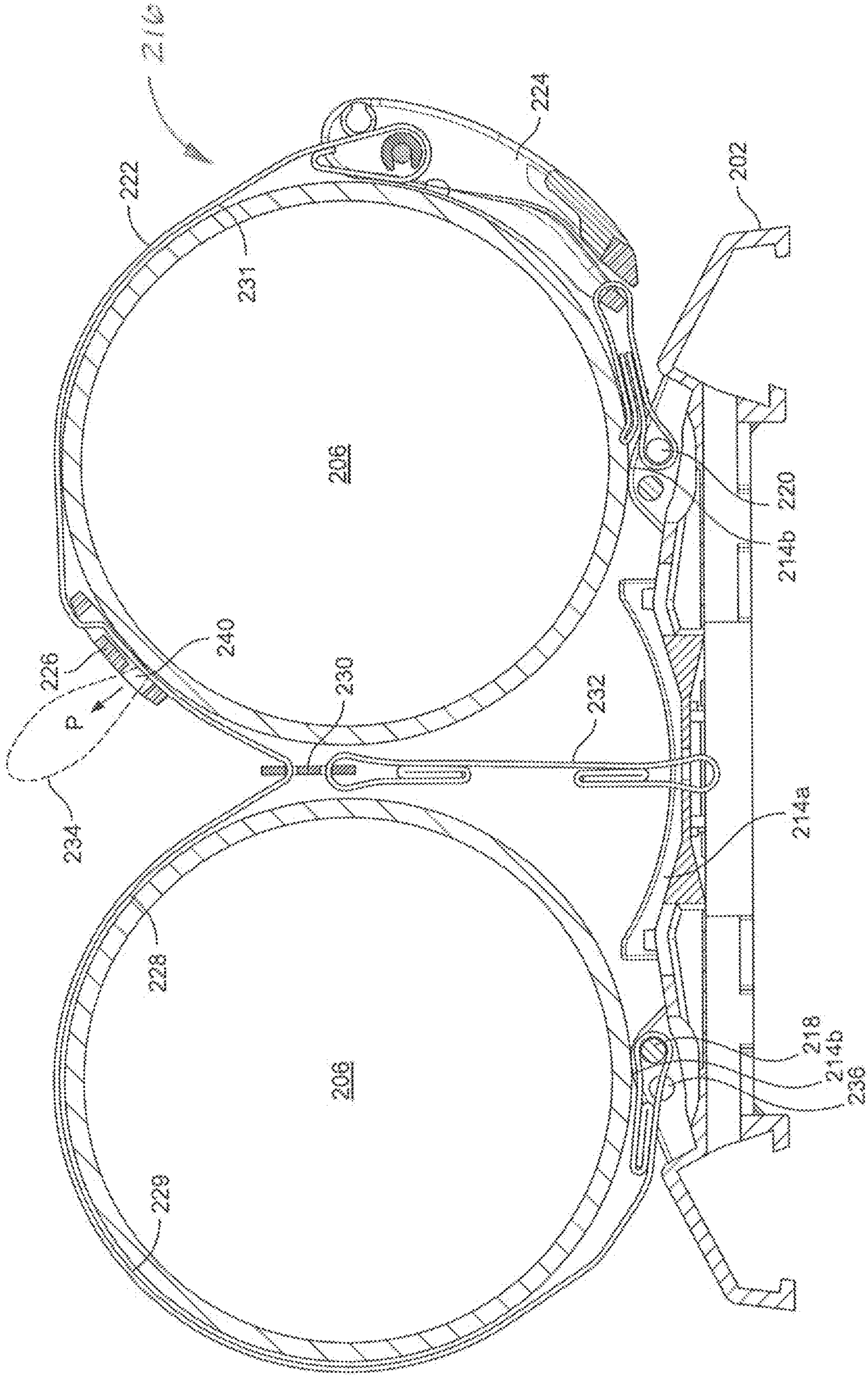
FIG. 7B is a sectional view of the breathing apparatus of FIG. 7A.

It should be appreciated that, although the above exemplary embodiment has a secondary strap loop formed in both the expanded and contracted configurations, in some examples, there may be no secondary strap loop formed in the expanded configuration. Such an example is shown in FIGS. 7A and 7B. Here, a breathing apparatus 200 is shown. Like features with the example of FIGS. 2A and 2B are indicated with reference numerals differing by 100.

In FIG. 7B, the breathing apparatus 200 can be observed in more detail. FIG. 7B shows a sectional view of the frame 202, cylinders 206, and cylinder retaining apparatus 212 along the line BB in FIG. 7A, viewed longitudinally down the apparatus 200. The frame 202 comprises a cylinder cradle 214 which has a single central concave profile **214*a* to receive the convex shell of a single cylinder in the contracted configuration, and dual concave profiles 214*b* laterally spaced apart for receiving respective cylinders 206 in this expanded configuration. The profiles 214*b* serve to locate the cylinders 206 in the correct position on the frame 202**.

The breathing apparatus 200 comprises a cylinder-retaining apparatus 212 comprising a strap apparatus 216 which is secured at first and second ends respectively to a first fixing point 218 and a second fixing point 220 so as to form a main strap loop 228 for extending around and securing the two cylinders 206. The strap apparatus 216 comprises a strap 222, a tensioning mechanism 224, and an adjustment buckle 226. In addition, the strap apparatus 216 comprises a pull-down buckle 230 which is secured to a distal end of a pull-down strap 232.

As can be observed in FIG. 7B, while the strap 222 extends through the adjustment buckle 226, it is not formed into a secondary strap loop like the example of FIG. 2B. Therefore, the strap apparatus 216 is in its longest-possible configuration in FIG. 7B for securing large cylinders.

In order to adjust the cylinder-retaining apparatus 212 to secure a single cylinder only, a secondary strap loop 234 can be formed to take up the excess strap 222 which is no longer required to encircle a second cylinder. The adjustment buckle 226 comprises a slot 240, and a portion of the strap 222 can be folded and inserted through the slot 240. The formation of the secondary strap loop 234 is illustrated by the arrow P in FIG. 7B. Once the secondary strap loop 234 has been formed, it can be drawn around to the third fixing point 236 and secured so as to secure the excess strap 222.

As shown in FIG. 6, the pull-down buckle 230 may have a cut-away slot 242 which can releasably secure the secondary strap loop 234. Therefore, the cylinder-retaining apparatus 212 can be optionally finely adjusted in the expanded configuration for differently sized cylinders by forming a secondary strap loop 234 and securing it to the cut-away slot 242.

It will be appreciated by a skilled person that although the invention has been described by way of example, with reference to exemplary examples, it is not limited to the disclosed examples and that alternative examples could be constructed without departing from the scope of the invention as defined by the appended claims.

For the avoidance of doubt, the present disclosure includes the subject matter recited in the following numbered Paras:

Para 1. A cylinder-retaining apparatus for a breathing apparatus comprising:
- first and second fixing points
- a strap apparatus secured to the first fixing point and the second fixing point and forming a main strap loop for extending around and securing one or more cylinders, the strap apparatus being configurable in:
- i) an expanded configuration in which the main strap loop forms a first effective length for securing a first number of cylinders; and
- ii) a contracted configuration in which a portion of a strap of the strap apparatus is folded to form a secondary strap loop and the secondary loop is secured to a third fixing point such that the main strap loop forms a second effective length shorter than the first effective length for securing a second number of cylinders less than the first number of cylinders.

Para 2. A cylinder-retaining apparatus as recited in Para 1, wherein:
- in the multiple-cylinder configuration, the strap is also folded to form the secondary loop; and
- wherein the secondary loop contains a greater length of the strap in the contracted configuration than in the expanded configuration.

Para 3. A cylinder-retaining apparatus as recited in Para 2, wherein the folded portion of the strap extends through a first buckle, thereby forming the secondary loop.

Para 4. A cylinder-retaining apparatus as recited in Para 3, further comprising a second buckle through which the secondary loop extends and through which the main strap loop extends, such that when the second buckle is moved relative to the main strap loop, the secondary loop is moved relative to the main strap loop.

Para 5. A cylinder-retaining apparatus as recited in Para 4, wherein the first and second buckles are configured such that moving the first and second buckles apart along the main strap loop shortens the effective length of the main strap loop, and moving the first and second buckles together along the main strap loop extends the effective length of the main strap loop.

Para 6. A cylinder-retaining apparatus as recited in Para 4 or 5, wherein a pull-down strap extends between the frame and the second buckle.

Para 7. A cylinder-retaining apparatus as recited in any one of Paras 4-6, wherein the second buckle defines a first portion of the main strap loop between the first fixing points and the second buckle, and a second portion of the main strap loop between the second fixing point and the second buckle Para 8. A cylinder-retaining apparatus as recited in Para 7, wherein, in the expanded configuration, the second buckle is arranged relative to the main strap loop such that the first and second portions of the main strap loop are substantially equal in length.

Para 9. A cylinder-retaining apparatus as recited in Para 7 or 8, wherein, in the contracted configuration, the second buckle is arranged relative to the main strap loop proximate the second fixing point, such that the second portion of the main strap loop is substantially shorter in length than the first portion of the main strap loop.

Para 10. A cylinder-retaining apparatus as recited in any one of Paras 7-9, wherein, in the expanded configuration, the second portion of the main strap loop is at least partially overlaid by the secondary loop.

Para 11. A cylinder-retaining apparatus as recited in any one of Paras 7-10, wherein the second portion of the main strap loop is overlaid by the secondary loop between the first and second buckles.

Para 12. A cylinder-retaining apparatus as recited in any preceding Para, further comprising a securing buckle for applying tension to the main strap loop.

Para 13. A cylinder-retaining apparatus as recited in any preceding Para, wherein the third fixing point is:
- I) proximate the second fixing point;
- II) outside of the first and second fixing points,
- Ill) releasable by hand.

Para 14. A cylinder retaining apparatus for securing a cylinder to a breathing apparatus comprising:
- a frame comprising a first fixing point and a second fixing point;
- a strap apparatus secured to the first fixing point and the second fixing point and forming a main strap loop for extending around one or more cylinders, the main strap loop having an effective length between the first and second fixing points;
- an adjustment mechanism for adjusting the effective length of the main strap loop;
- a pulldown strap slidably secured to the main strap loop, wherein
- the frame comprises a third fixing point; and
- the cylinder-retaining apparatus is configurable in:
  - i) a single-cylinder configuration in which the adjustment mechanism provides a first effective length of the main strap loop and an intermediate portion of strap is secured to the third fixing point; and
  - ii) a multiple-cylinder configuration in which the adjustment mechanism is adjusted to provide a second effective length of the main strap loop which is longer than the first effective length, the strap is not secured to the third fixing point.

The invention claimed is:

1. A cylinder-retaining apparatus for a breathing apparatus comprising:
- a support frame comprising a first fixing point, a second fixing point, and a third releasable fixing point on the support frame, the third fixing point being located outside of the first and second fixing points;
- a strap apparatus secured at a first end to the first fixing point and secured at a second end to the second fixing point, the strap apparatus forming a main strap loop for extending around and securing one or more cylinders, the strap apparatus being configurable in:
  - i) an expanded configuration in which the main strap loop forms a first effective length for securing a first number of cylinders; and
  - ii) a contracted configuration in which a portion of a strap of the strap apparatus is folded to form a secondary strap loop and the secondary loop is secured to the third releasable fixing point such that the main strap loop forms a second effective length shorter than the first effective length for securing a second number of cylinders less than the first number of cylinders.

2. A cylinder-retaining apparatus as claimed in claim 1, wherein in the expanded configuration, the strap is also folded to form the secondary loop; and wherein the secondary loop contains a greater length of the strap in the contracted configuration than in the expanded configuration.

3. A cylinder-retaining apparatus as claimed in claim 2, wherein the folded portion of the strap extends through a first buckle, thereby forming the secondary loop.

4. A cylinder-retaining apparatus as claimed in claim 3, further comprising a second buckle through which the secondary loop extends and through which the main strap loop extends, such that when the second buckle is moved relative to the main strap loop, the secondary loop is moved relative to the main strap loop.

5. A cylinder-retaining apparatus as claimed in claim 4, wherein the first and second buckles are configured such that moving the first and second buckles apart along the main strap loop shortens the effective length of the main strap loop, and moving the first and second buckles together along the main strap loop extends the effective length of the main strap loop.

6. A cylinder-retaining apparatus as claimed in claim 4, wherein a pull-down strap extends between the support frame and the second buckle.

7. A cylinder-retaining apparatus as claimed in claim 4, wherein the second buckle defines a first portion of the main strap loop between the first fixing point and the second buckle, and a second portion of the main strap loop between the second fixing point and the second buckle.

8. A cylinder-retaining apparatus as claimed in claim 7, wherein, in the expanded configuration, the second buckle is arranged relative to the main strap loop such that the first and second portions of the main strap loop are substantially equal in length.

9. A cylinder-retaining apparatus as claimed in claim 7, wherein, in the contracted configuration, the second buckle is arranged relative to the main strap loop proximate the first fixing point, such that the second portion of the main strap loop is substantially shorter in length than the first portion of the main strap loop.

10. A cylinder-retaining apparatus as claimed in claim 7, wherein, in the expanded configuration, the second portion of the main strap loop is at least partially overlaid by the secondary loop.

11. A cylinder-retaining apparatus as claimed in claim 7, wherein the second portion of the main strap loop is overlaid by the secondary loop between the first and second buckles.

12. A cylinder-retaining apparatus as claimed in claim 1, further comprising a securing buckle for applying tension to the main strap loop.

13. A cylinder-retaining apparatus as claimed in claim 1, wherein the third releasable fixing point is:

I.) proximate the first fixing point; and,

II.) releasable by hand.

14. A breathing apparatus comprising a cylinder retaining apparatus as claimed in claim 1.

15. A cylinder retaining apparatus for securing a cylinder to a breathing apparatus comprising:

a frame comprising a first fixing point, a second fixing point, and a third releasable fixing point, the third releasable fixing point being located outside of the first and second fixing points, and being releasable from the frame;

a strap apparatus secured to the first fixing point and the second fixing point and forming a main strap loop for extending around one or more cylinders, the main strap loop having an effective length between the first and second fixing points;

an adjustment mechanism for adjusting the effective length of the main strap loop;

a pulldown strap slidably secured to the main strap loop; and the cylinder-retaining apparatus is configurable in:

i) a single-cylinder configuration in which the adjustment mechanism provides a first effective length of the main strap loop and an intermediate portion of strap is secured to the third releasable fixing point; and ii) a multiple-cylinder configuration in which the adjustment mechanism is adjusted to provide a second effective length of the main strap loop which is longer than the first effective length, the strap is not secured to the third releasable fixing point.

* * * * *